(12) United States Patent
Trajkovic et al.

(10) Patent No.: US 6,727,807 B2
(45) Date of Patent: Apr. 27, 2004

(54) DRIVER'S AID USING IMAGE PROCESSING

(75) Inventors: Miroslav Trajkovic, Ossining, NY (US); Srinivas Gutta, Yorktown Heights, NY (US); Antonio Colmenarez, Maracaibo (VE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/017,376

(22) Filed: Dec. 14, 2001

(65) Prior Publication Data

US 2003/0112132 A1 Jun. 19, 2003

(51) Int. Cl.$^7$ ................................................. B60Q 1/00
(52) U.S. Cl. ........................ 340/436; 340/435; 340/438; 340/995.13; 340/426.14; 340/426.15; 340/576; 340/903
(58) Field of Search ................................ 340/436, 435, 340/438, 995.13, 426.14, 426.15, 426.16, 471, 472, 468, 988, 995.1, 576, 439, 903

(56) References Cited

U.S. PATENT DOCUMENTS

| | | | | |
|---|---|---|---|---|
| 4,937,665 | A | | 6/1990 | Schiffman ................ 358/103 |
| 5,001,558 | A | | 3/1991 | Burley et al. ............. 358/113 |
| 5,061,996 | A | | 10/1991 | Schiffman ................ 358/103 |
| 5,309,137 | A | * | 5/1994 | Kajiwara .................. 340/436 |
| 5,414,439 | A | * | 5/1995 | Groves et al. ............ 340/436 |
| 6,262,848 | B1 | * | 7/2001 | Anderson et al. ......... 359/630 |
| 6,429,789 | B1 | * | 8/2002 | Kiridena et al. .......... 340/905 |
| 6,447,132 | B1 | * | 9/2002 | Harter, Jr. ................ 345/207 |
| 6,472,977 | B1 | * | 10/2002 | Pochmuller ............. 340/425.5 |
| 6,538,622 | B1 | * | 3/2003 | Kojima et al. ............ 340/901 |

FOREIGN PATENT DOCUMENTS

| | | | |
|---|---|---|---|
| JP | 410217903 | A * | 8/1998 |
| WO | WO 9100674 | | 1/1991 |

OTHER PUBLICATIONS

McKenna, Stephen et al., *Tracking Faces*, Proceedings of the Second Int'l Conference on Automatic Face and Gesture Recognition, Oct. 14–16, 1996, Killington VT, pp. 271–276.

U.S. patent application Ser. No. 09/794,443, entitled "Classification of Objects Through Model Ensembles" for Srinivas Gutta and Vasanth Philomin, filed Feb. 27, 2001, Attorney Docket No. US010040.

Document entitled "DeVille Becomes First Car To Offer Safety Benefits Of Night Vision" published by G.M. at http://www.gm.com/company/gmability/safety/crash_avoidance/newfeatures/night_vision.html.

"Autonomous Driving Approaches Downtown" by U. Franke et al., IEEE Intelligent Systems, vol. 13, No. 6, 1998.

(List continued on next page.)

*Primary Examiner*—Jeffrey Hofsass
*Assistant Examiner*—Daniel Previl

(57) ABSTRACT

A system and method for alerting a driver of an automobile to a traffic condition. The system comprises at least one camera having a field of view and facing in the forward direction of the automobile. The camera captures images of the field of view in front of the automobile. A control unit receives images of the field of view from the camera and identifies objects therein of a predetermined type. The control unit analyzes the object images of at least one predetermined type to determine whether one or more of the identified objects present a condition that requires the driver's response. A display receives control signals from the control unit regarding the one or more of the objects that present a condition that requires the driver's response. The display displays an image of the object to the driver that is positioned and scaled so that it overlays the actual object as seen by the driver, the displayed image of the object enhancing a feature of the actual object to alert the driver.

12 Claims, 5 Drawing Sheets

OTHER PUBLICATIONS

"Real–Time Object Detection For "Smart " Vehicles" by D.M. Gavrila and V. Philomin, Proceedings of IEEE International Conference On Computer Vision, Kerkyra, Greece 1999.

Chapter 7 (entitled "Stereopsis") of text "Introductory Techniques for 3–D Computer Vision" by Trucco and Verri, (Prentice Hall, 1998).

Announcement document "Siemens VDO's Color Head–Up Display Nears First Application", Sep. 12, 2001, published at www. itsa.org/itsnews.nsf/$All/ 2E4A7421A07B0D6085256AC50067468A?OpenDocument.

"Pedestrian Detection From A Moving Vehicle" by D.M. Gavrila, Proceedings Of The European Conference On Computer Vision, Dublin, Ireland, 2000.

Document entitled "Smart Vehicles"published at www.gavrila.net/Computer_Vision/smart_Vehicles/smart_vehicles.html.

"Humanistic Intelligence: "WearComp" As A New Framework And Application For Intelligent Signal Processing" by Steve Mann, published at www.wearcam.org/hi/index/html.

U.S. patent application Ser. No. 09/953,642, entitled "Intelligent Quad Display Through Cooperative Distributed Vision", for Srinivas Gutta et al., filed Sep. 17, 2001 (Attorney Docket US010445).

U.S. patent application Ser. No. 09/703,423, entitled "Person Tagging In An Image Processing System Utilizing A Statistical Model Based On Both Appearance And Geometric Features" for Antonio Colmenarez and Srinivas Gutta, filed Nov. 1, 2000 (Attorney Docket US000273).

"Real–Life Cyborg Challenges Reality With Technology" by Bruce Schechter, New York Times (Science Section) Sep. 25, 2001.

* cited by examiner

DRIVER'S AID USING IMAGE PROCESSING

FIELD OF THE INVENTION

The invention relates to automobiles and, in particular, to a system and method for processing various images and detecting conditions in the driving environment based thereon and notifying the driver of certain conditions, when appropriate.

BACKGROUND OF THE INVENTION

Much of today's driving occurs in a demanding environment. The proliferation of automobiles and resulting traffic density has increased the amount of external stimulii that a driver must react to while driving. In addition, today's driver must often perceive, process and react to a driving condition in a lesser amount of time. For example, speeding and/or aggressive drivers give themselves little time to react to a changing condition (e.g., a pothole in the road, a sudden change of lane of a nearby car, etc.) and also give nearby drivers little time to react to them.

Despite advancements in digital signal processing technologies, including computer vision, pattern recognition, image processing and artificial intelligence (AI), little has been done to assist drivers with the highly demanding decision-making involved in normal driving. In one system implemented in the Cadillac DeVille, military "Night Vision" is adapted to detect objects in front of the automobile. Heat in the form of high emission of infrared radiation from humans, other animals and cars in front of the car is captured using cameras (focusing optics) and focused on an infrared detector. The detected infrared radiation data is transferred to processing electronics and used to form a monochromatic image of the object. The image of the object is projected by a head-up display near the front edge of the hood in the driver's peripheral vision. At night, objects that may be outside the range of the automobiles headlights may thus be detected in advance and projected via the heads-up display. The system is described in more detail in the document "DeVille Becomes First Car To Offer Safety Benefits Of Night Vision" at http://www.gm.com/company/gmability/safety/crash_avoidance/newfeatures/night_vision.html.

Among other deficiencies of the DeVille Night Vision system, the display only provides the thermal image of the object, and the driver is left to identify what the object is by the contour of the thermal image. The driver may not be able to identify the object. For example, the thermal contour of a person riding a bicycle (which has a relatively low thermal signature) may be too alien for a driver to readily discern. The mere presence of such an unidentifiable object may also be distracting. Finally, it is difficult for the driver to judge the relative position of the object in the actual environment, since the thermal image of the object is displayed near the front edge of the hood.

U.S. Pat. No. 5,414,439 to Groves et al. also relates to a Night Vision type system that outputs a video signal of a thermal image to a head up display (HUD). In one case, virtual images of pedestrians are projected below the actual image seen by the driver, thus forewarning the driver of pedestrians that may not be visible in the actual image. Alternatively, the virtual images are superimposed on the real scene. In U.S. Pat. No. 5,001,558 to Burley et al., light captured by a color camera is superimposed on thermal signals captured by an infrared imaging device. Thus, for example, a red signal light emitted by a traffic signal is captured by the color camera and superimposed on the thermal image created by the warm traffic signal and displayed.

A method of detecting pedestrians and traffic signs is described in "Real-Time Object Detection For "Smart" Vehicles" by D. M. Gavrila and V. Philomin, Proceedings of IEEE International Conference On Computer Vision, Kerkyra, Greece 1999 (available at www.gavrila.net), the contents of which are hereby incorporated by reference herein. A template hierarchy captures a variety of object shapes, and matching is achieved using a variant of Distance Transform based-matching, that uses a simultaneous coarse-to-fine approach over the shape hierarchy and over the transformation parameters. The Introduction section refers to informing the driver (or taking other measures) regarding certain potential hazards, such as a collision with a pedestrian, speeding, or turning the wrong way down a one-way street. It is noted, however, that the focus of the document is on detection of the above-mentioned objects and does not describe how or the particular circumstances under which the driver is alerted of a potentially hazardous situation.

A method of detecting pedestrians on-board a moving vehicle is also described in "Pedestrian Detection From A Moving Vehicle" by D. M. Gavrila, Proceedings Of The European Conference On Computer Vision, Dublin, Ireland, 2000, the contents of which are hereby incorporated by reference herein. The method builds on the template hierarchy and matching using the coarse-to-fine approach described above, and then utilizes Radial Basis Functions (RBFs) to attempt to verify whether the shapes and objects are pedestrians. The focus of the document is also on detection of pedestrians and does not describe alerting of the driver.

"Autonomous Driving Approaches Downtown" by U. Franke et al., IEEE Intelligent Systems, vol. 13, no. 6, 1998 (available at www.gavrila.net) describes an image recognition that focuses on application to autonomous vehicle guidance. The Introduction section refers to numerous prior art vision systems for lateral and longitudinal vehicle guidance, lane departure warning and collision avoidance. The document describes image recognition of pedestrians, obstacles (such as other automobiles), road boundaries and markings, traffic signals and traffic signs. While the focus of the document is on vehicle guidance, among other things, the document also refers to rear-end collision avoidance or red traffic light recognition and warning, tracking road contours and providing a lane departure warning, and warning the driver when driving faster than the speed limit. In particular, FIG. 4.9 shows a display of a detected red light, where an enlarged and prominent image of the red light is displayed adjacent the actual image of the red light in a monitor-style display. (See, also, "Smart Vehicles" at www.gavrila.net/Computer_Vision/Smart_Vehicles/smart_vehicles.html, which indicates that a monitor-style display is used.)

SUMMARY OF THE INVENTION

The prior art fails to provide a comprehensive system that detects potentially hazardous traffic situations via image recognition, and then present an image of the hazard to the driver in a manner that is designed to alert the driver without unnecessarily distracting him or her and effectively provide the location of the potential hazard.

It is thus an objective of the invention to provide a system and method for alerting a driver of an automobile to a traffic condition. The system comprises at least one camera having a field of view and facing in the forward direction of the automobile. The camera captures images of the field of view in front of the automobile. A control unit receives images of the field of view from the camera and identifies objects therein of at least one predetermined type. The control unit analyzes the object images of the at least one predetermined type to determine whether one or more of the identified objects of the at least one predetermined type present a condition that requires the driver's response. A display receives control signals from the control unit regarding those objects of the at least one predetermined type that present a condition that requires the driver's response. The display displays an image of those objects that require a response to the driver that is positioned and scaled so that it overlays (is superimposed with respect to) the actual object as seen by the driver, the displayed image of the object enhancing a feature of the actual object to alert the driver.

The method comprises the steps of first capturing images of the field of view in front of the automobile. Objects in the image of at least one predetermined type are identified and analyzed to determine whether one or more of the identified objects present a condition that requires the driver's response. If at least one of the objects identified in the image requires the driver's response an image of the object is displayed to the driver. The displayed image is positioned and scaled so that it overlays the actual object as seen by the driver. The displayed image of the object enhances a feature of the actual object to alert the driver.

DETAILED DESCRIPTION

Figure 1:
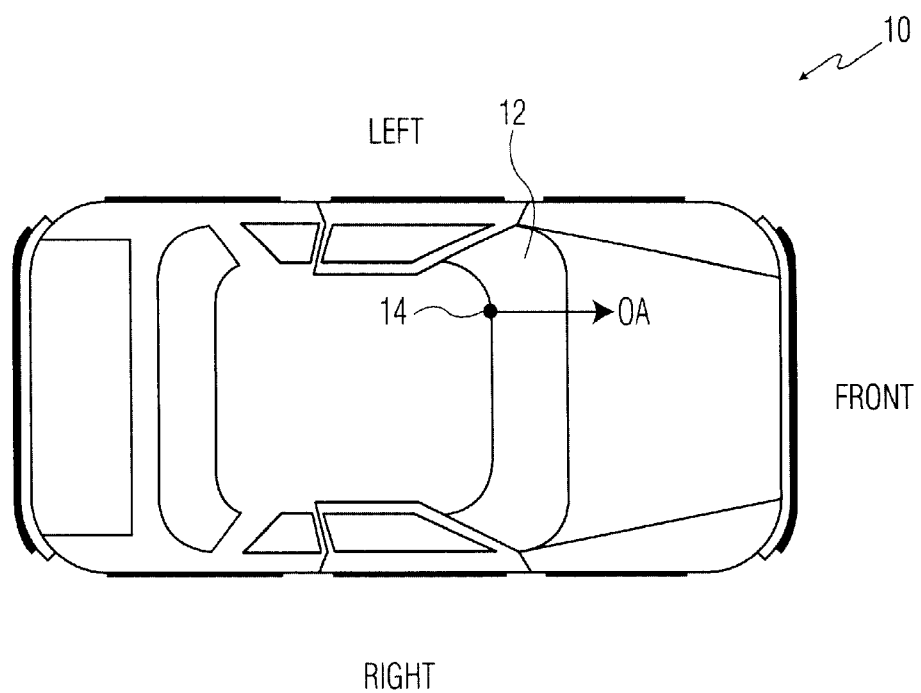
FIG. 1 is a side view of an automobile that incorporates an embodiment of the invention.
Figure 1A:
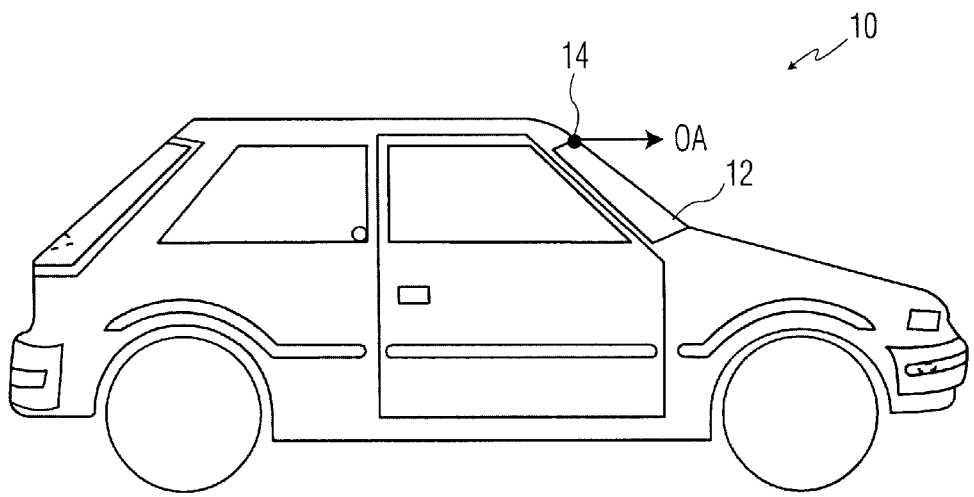
FIG. 1a is a top view of the automobile of FIG. 1.

Referring to FIG. 1, an automobile 10 is shown that incorporates an embodiment of the invention. As shown, camera 14 is located at the top of the windshield 12 with its optic axis pointing in the forward direction of the automobile 10. The optic axis (OA) of camera 14 is substantially level to the ground and at substantially the same position along the dashboard as the driver, as shown in FIG. 1a. Camera 14 captures images in front of the automobile 10. The field of view of camera 14 is preferably on the order of 180°, thus the camera captures substantially the entire image in front of the auto. The field of view, however, may be less than 180°.

Figure 2:
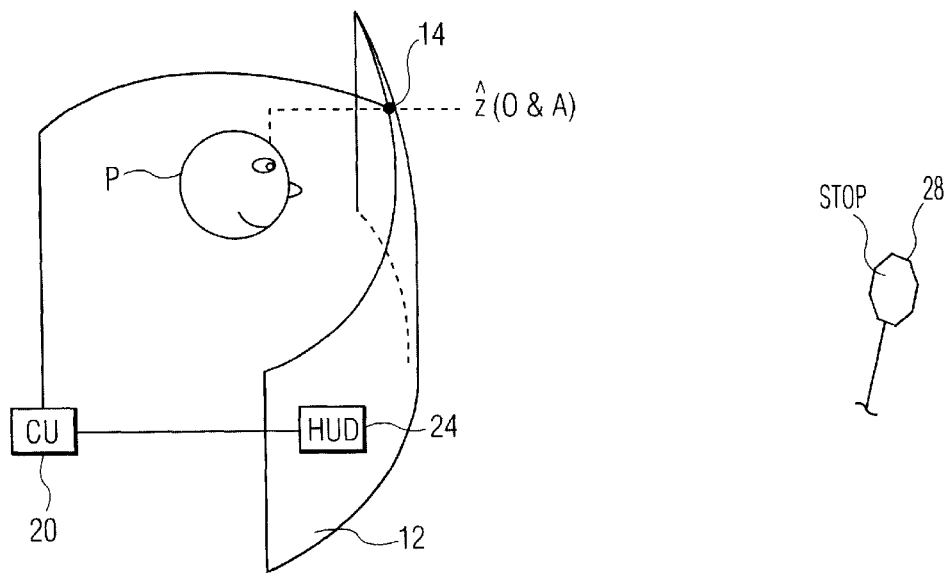
FIG. 2 is a representative drawing of components of the embodiment of FIGS. 1 and 1a and other salient features used to describe the embodiment.

Referring to FIG. 2, additional components of the system that support the embodiment of the invention, as well as the relative positions of the components and the driver's head P are shown. FIG. 2 shows the position of the driver's head P in its relative position on the left hand side, behind the windshield 12. Camera 14 is on the portion of the windshield 12 directly in front of, and slightly above, the driver's head P, as represented by the dashed lines between camera 14 and driver's head P in FIG. 2.

Thus, as a first order approximation, the center and perspective of the field of view of the camera 14 corresponds to that of the field of view of the driver P. Images captured by camera 14 are transferred to control unit 20. The field of view of the driver P and camera 14 of FIG. 2 includes, for example, stop sign 28.

Figure 3:
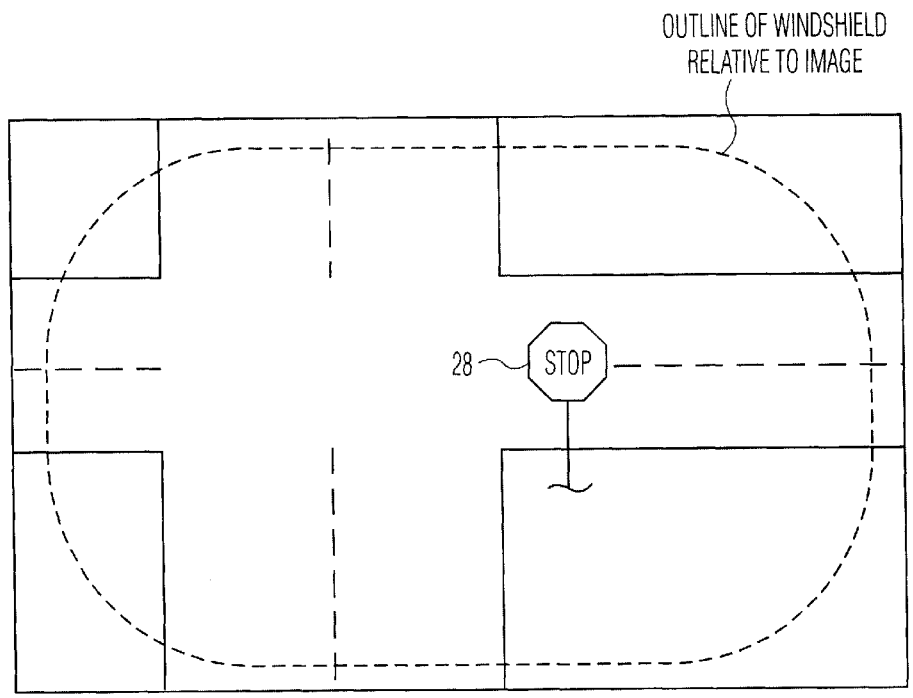
FIG. 3 is an image generated by the camera of the embodiment of FIGS. 1–2.

Referring to FIG. 3, stop sign 28 and the surrounding environment is shown in the images received by control unit 20 at a point in time from camera 14. Control unit 20 is programmed with image recognition software that analyzes the images received and detects traffic signs, human bodies, other automobiles, the boundaries of the roadway and objects or deformations in the roadway, among other things. The image recognition software may incorporate, for example, the shape-based object detection described in the "Real-Time Object Detection for "Smart" Vehicles" noted above. Among other objects, the control unit 20 is programmed to identify the shapes of various traffic signs, such as the stop sign 28 in FIG. 3.

Once the image recognition software identifies the stop sign 28 of FIG. 3 in an image received from fine camera 14, the control unit 20 may be programmed, for example, to immediately alert the driver of the upcoming stop sign, or to alert the driver under certain circumstances. For example, the size of the template generated for the stop sign in the shape-based object detection technique described in "Real-Time Object Detection for "Smart" Vehicles" may be correlated to distance from the automobile in control unit 20. If the control unit 20 determines that the speed of the automobile is excessive in relation to the distance to the stop sign 28, an alert may be generated.

Figure 3A:
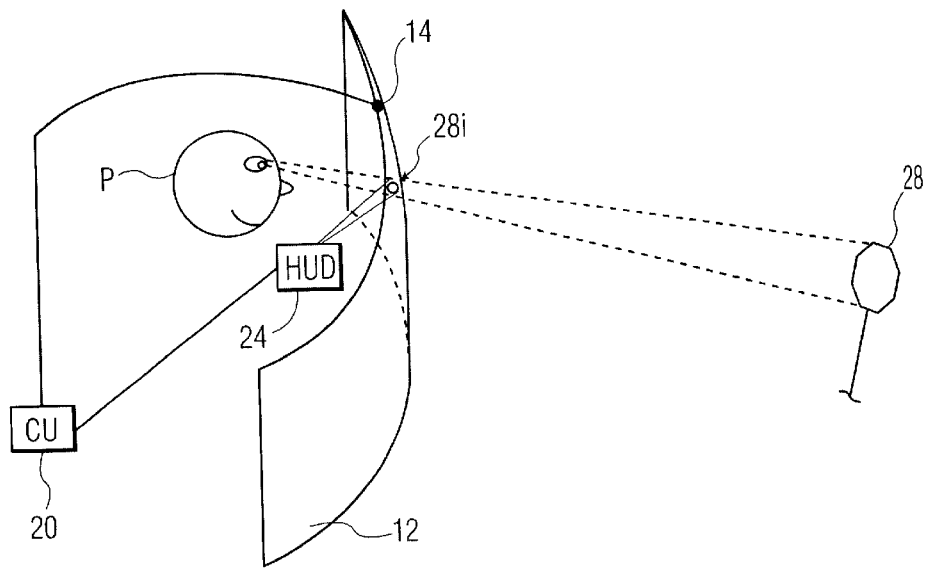
FIG. 3a is as described for FIG. 2 and further includes an image projected by the system onto the windshield.

In the embodiment, the alert of the impending stop sign 28 is provided by providing an enhanced image of the stop sign 28 to the driver P on a head-up display (HUD) 24 connected to control unit 20. Control unit 20 is programmed to translate the coordinates of objects in the image to a position on the windshield. For example, the outline of the windshield 12 relative to the image shown in FIG. 3 is given by the dashed line. As a first-order approximation, control unit 20 may linearly map the stop sign 28 from the image to its corresponding position on the windshield via the HUD 24. As previously noted, the center and perspective of the field of view of camera 14 is approximately the same as that of the driver P. Thus, the size and position of the image of the stop sign 28 projected by the HUD 28 on the windshield will substantially overlay the actual stop sign 28 as seen by the driver P through the windshield. This is shown in FIG. 3a, which depicts the image of the stop sign $28_i$ projected by the HUD 24 optics onto windshield 12 that overlays the actual stop sign 28 in the driver's field of view. In order to gain the driver's attention, the projected image may be made to flash, increase in intensity, or other visual cue to gain the driver's attention. If the control unit 20 determines that the driver P is not responding (for example, the speed does not decrease), the alert may intensify, for example, through brighter flashing, the addition of an audio alert, or other.

As noted, the control unit 20 of the above-described embodiment of the invention may be programmed to detect stop signs and other traffic control signs and to detect situations that require the driver be alerted. In other examples, if the automobile 10 is detected as heading toward a "Do Not Enter" or "Wrong Way" sign, the sign is highlighted via the overlaying image projected by the HUD 24 or other alert is given. (As noted, the control unit 20 can project the direction in which the car is traveling from the image, since the OA of the camera 14 is directed forward with respect to the auto. The control unit 20 may also receive the automobile's speed from the automobile's processor, the direction in which the automobile is turning from sensors on steering components, etc.) Similarly, the control unit 20 may be programmed to detect the contour of a traffic signal and to also analyze the current color state of the signal (red, amber or green). If the signal is red or amber, for example, and the automobile 10 is not slowing, the HUD 24 is used to project an overlaying image that highlights the actual signal and alert the driver.

In addition, the image gradient of the borders of the road may be detected as a "shape" using the template method in the shape-based object detection technique described in "Real-Time Object Detection for "Smart" Vehicles". If the direction of the automobile 10 is detected to intersect the border of the road, signifying that the driver is swerving off the road, the HUD 24 may be engaged to highlight the contour of the road to the driver as an alert. As noted, the HUD alert may intensify and audio alerts may be generated if the auto is not slowed, or the course is not corrected. Certain additional circumstances may have to be present in order to generate the alert. For example, if a car is turned at an intersection (for example, such as that shown in FIG. 3), it will be temporarily pointed at the border of the road onto which the auto is being turned. Thus, the alert is not generated if the control unit 20 detects that the contours of the roadways in the image comprise an intersection (such as that shown in FIG. 3) and also detects that the auto is making a consistent turn when the current image depicts that the auto is within the intersection. Alternatively, over short intervals the control unit 20 may determine the distance to the border of the roadway in the direction the auto is heading based upon the size and shape of the template that matches the roadway in the image. If the auto is traveling at or above a threshold speed in relation to the distance to the border of the roadway, the alert is generated.

In general, control unit 20 analyzes a succession of received images and identifies the traffic signs, roadway contour, etc. in each such image. All of the images may be analyzed or a sample may be analyzed over time. Each image may be analyzed independently of prior images. In that case, a stop sign (for example) is independently identified in a current image received even if it had previously been detected in a prior image received. The various thresholds and conditions for generating an alert are based on the conditions that are detected by the control unit 20 for the images as identified in each image.

Alternatively, if an object is identified in an image as being a control signal, traffic sign, etc., control unit 20 may be further programmed to track its movement in subsequently received images, instead of independently identifying it anew in each subsequent image. Tracking the motion of an identified object in successive images based on position, motion and shape may rely, for example, on the clustering technique described in "Tracking Faces" by McKenna and Gong, Proceedings of the Second International Conference on Automatic Face and Gesture Recognition, Killington, Vt., Oct. 14–16, 1996, pp. 271–276, the contents of which are hereby incorporated by reference. (Section 2 of the aforementioned paper describes tracking of multiple motions.) By tracking the motion of an object between images, control unit 20 may also determine its speed and trajectory relative to the automobile. The detected speed and trajectory may supply the conditions under which the control unit 20 projects an alert via the HUD 24 to the driver in the form of an enhanced overlay of a traffic sign, traffic signal, etc.

As noted above, the control unit 20 of the above-described embodiment of the invention may also be programmed to detect objects that are themselves moving, such as pedestrians and other automobiles and to alert the driver using the HUD 24 to possible collision trajectories or other dangerous situations. Where pedestrians and other objects in motion are to be detected (along with traffic signals, traffic signs, etc.), control unit 20 is programmed with the identification technique as described in "Pedestrian Detection From A Moving Vehicle". As noted, this provides a two step approach for pedestrian detection that employs an RBF classification as the second step. The template matching of the first step and the training of the RBF classifier in the second step may also include automobiles, thus control unit 20 is programmed to identify pedestrians and automobiles in the received images. (The programming may also include templates and training for the stationary traffic signs, signals, roadway boundaries, etc. focused on above, thus providing the entirety of the image recognition processing of the control unit 20.)

Once an object is identified as a pedestrian, other automobile, etc. by control unit 20, its movement may be tracked in subsequent images using the clustering technique as described in "Tracking Faces", noted above. Control unit 20 uses the tracking data to determine the current speed and direction of movement of a pedestrian or other automobile relative to the current position of automobile 10. Control unit 20 also uses the speed and direction of movement of automobile 10 to project a trajectory of automobile 10. If the projected trajectory of the pedestrian or other automobile and the projected trajectory of the automobile 10 cross within a certain interval of time in the future, then an alert of a potential collision is generated by the control unit 20. Other conditions may be required before an alert is generated, such as a minimum threshold proximity in time before a collision is projected to occur. (This would eliminate, for example, alerting a driver to a collision course with a pedestrian that is two blocks away, where the trajectories of the pedestrian and automobile 10 will likely change long before a collision occurs.)

As described above, when an alert is generated, control unit 20 linearly maps the pedestrian, automobile, or other object (including a stationary object) that is on a collision course with the automobile 10 from the image to its corresponding position on the windshield via the HUD 24. The image projected by the HUD 28 on the windshield is positioned and scaled so that it substantially overlays the actual pedestrian, automobile, etc. as seen by the driver P through windshield 12. In order to gain the driver's attention, the projected image may be made to flash, increase in intensity, or other visual cue to gain the driver's attention. If the control unit 20 determines that the driver P is not responding (for example, the speed does not decrease), the alert may intensify, for example, through brighter flashing, the addition of an audio alert, or other.

The alert initiated by control unit 20 can also warn the driver P of an unpredictable or dangerous situation, not necessarily the projection of a collision. For example, if another automobile identified by the control unit 20 is tracked and detected to be speeding, weaving, or conforming to other conditions indicating a potential hazard, the alert of the other automobile is generated. Also, cameras may be directed out of the back window and side windows of the automobile 10 and provide alerts based on potential side or rear collisions, potentially hazardous conditions from the side or rear, etc. The alert may be in the form of a HUD associated with the side or rear window generating an enhanced image that overlays the view of the actual identified object as seen through the side or rear window, and providing an audio alert (such as a recorded message) directing the driver's attention to the pertinent side or rear of the automobile. Thus, for example, if a reckless driver in another automobile is identified by control unit 10 as bearing down on the automobile 10 from the rear, the HUD overlay image of the other automobile is enhanced in the rear window and a recording (such as "auto fast approaching from rear") will alert the driver P to look in the rear-view mirror, where his eye will immediately be directed to the enhanced image that corresponds to the actual image. The enhancement may include, for example, flashing the image, intensifying the image or its borders, or other.

For the embodiment described above and shown in FIG. 2, control unit 20 linearly maps the image of the identified object to which an alert is being generated from the received camera image to its corresponding position on the windshield via the HUD 24. In the embodiment of FIG. 2, the center and perspective of the field of view of camera 14 is approximately the same as that of the driver P. The image of the object as mapped from the image received by the camera to the windshield 12 and then projected by the HUD 28 on the windshield substantially overlays the actual object as seen by the driver P through the windshield 12 (see FIG. 3a). This, however, is only a first order approximation of the position and size of the identified object on the windshield that corresponds to the actual object as seen by the driver through the windshield. It does not account for the curvature of the windshield, non-linearities of the optics of camera 20, etc.

Figure 4:
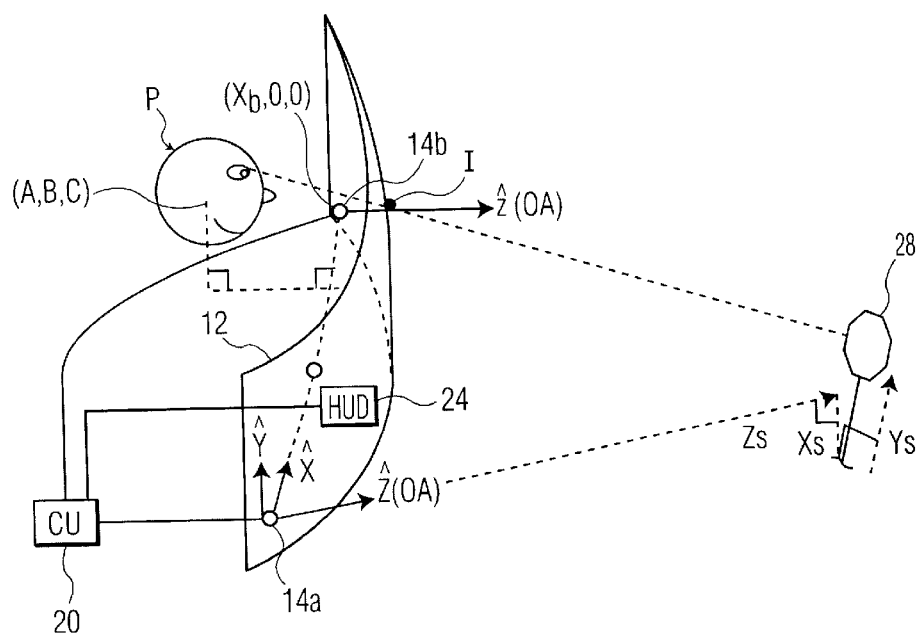
FIG. 4 is a representative drawing of components of an alternative embodiment and other salient features used to describe the embodiment.

FIG. 4 depicts an alternative embodiment where the identified object is projected on the HUD in a manner that more precisely aligns and scales the projected image to overlay the actual image that the driver views through the windshield. Two cameras 14a, 14b located at the right and left hand sides of windshield 12 provide images to control unit 20. The position of camera 14a coincides with the origin of a reference coordinate system, where the z-axis is in the direction of the optic axis of camera 14a (and the direction the automobile 10 is facing), the y-axis is upward and the x-axis is across the car or dashboard. The control unit 20 is programmed with the nominal coordinates of the driver's head (or eyes) in the reference coordinate system, shown as (A,B,C) in FIG. 4. In addition, the coordinates of points comprising the windshield 12 in the reference coordinate system are also programmed in control unit 20. (A matrix of points comprising the windshield may be used, a functional relationship defining the windshield may be used, or some combination may be used.)

Figure 5A:
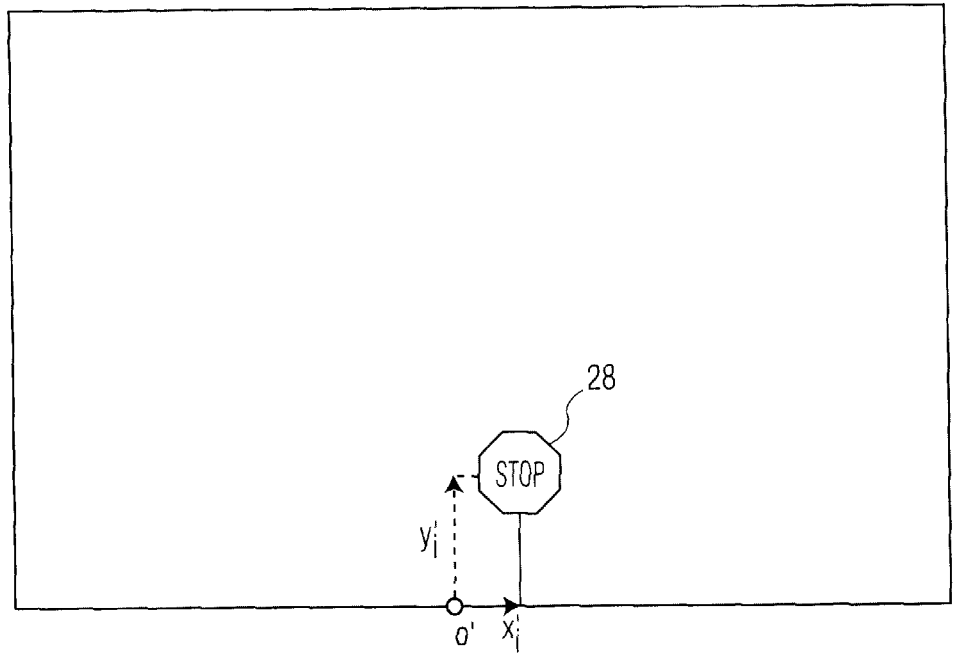
FIGS. 5a and 5b are images generated by the cameras of the embodiment of FIG. 4.
Figure 5B:
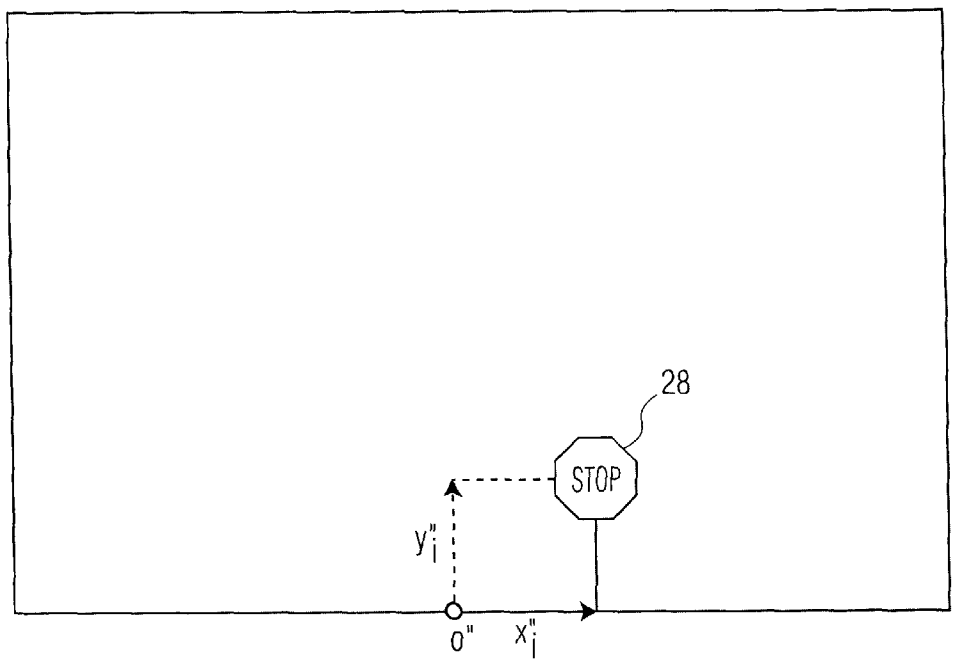

Control unit 20 receives images from both cameras 14a, 14b and identify objects, pedestrians, automobiles, etc., in the manner previously described. In FIG. 4, a stop sign 28 is again shown as an exemplary object that is identified in the images. FIGS. 5a and 5b depict the identified object as seen in images from cameras 14a and 14b, respectively. The center of stop sign 28 is at unknown position $(X_s, Y_s, Z_s)$ in the reference coordinate system. Control unit 20 identifies the center of the stop sign 28 in the camera images shown in FIGS. 5a and 5b as having image coordinates (x',y') and (x",y"), respectively, with respect to image origins O' and O" at the bottom center of the images. Unknown coordinates $(X_s, Y_s, Z_s)$ of the position the stop sign in the reference coordinate system of FIG. 4 may then be uniquely determined using standard techniques of computer vision known as the "stereo problem". Basic stereo techniques of three dimensional computer vision are described for example, in "Introductory Techniques for 3-D Computer Vision" by Trucco and Verri, (Prentice Hall, 1998) and, in particular, Chapter 7 of that text entitled "Stereopsis", the contents of which are hereby incorporated by reference. Using such well-known techniques, the relationship between the center of the stop sign in FIG. 4 (having unknown coordinates $(X_s, Y_s, Z_s)$) and the image position (x', y') of the center of the stop sign in FIG. 5a is given by the equations:

$$x' = X_s/Z_s \qquad (\text{Eq. 1})$$

$$y' = Y_s/Z_s \qquad (\text{Eq. 2})$$

Similarly, the relationship between the position of the stop sign in FIG. 4 and the image position of the stop sign in FIG. 5b (having known image coordinates (x",y")) is given by the equations:

$$x'' = (X_s - D)/Z_s \qquad (\text{Eq. 3})$$

$$y'' = Y_s/Z_s \qquad (\text{Eq. 4})$$

where D is the distance between cameras 14a, 14b. One skilled in the art will recognize that the terms given in Eqs. 1–4 are up to linear transformations defined by camera geometry.

Equations 1–4 have three unknown variables (coordinates $X_s, Y_s, Z_s$), thus the simultaneous solution by the control unit 20 gives the values of $X_s, Y_s$, and $Z_s$ and thus gives the position of the center of the stop sign 28 in the reference coordinate system of FIG. 4. Control unit 20 plots a line between the stop sign and the coordinates of the driver P located at (A,B,C), and determines where the line intersects a coordinate of the windshield 12 (which, as described above, are programmed in control unit 20). This point is shown as point I in FIG. 4. Thus, the control unit 20 creates the image of the stop sign 28 centered at the point I using the HUD 24.

Figure 6:
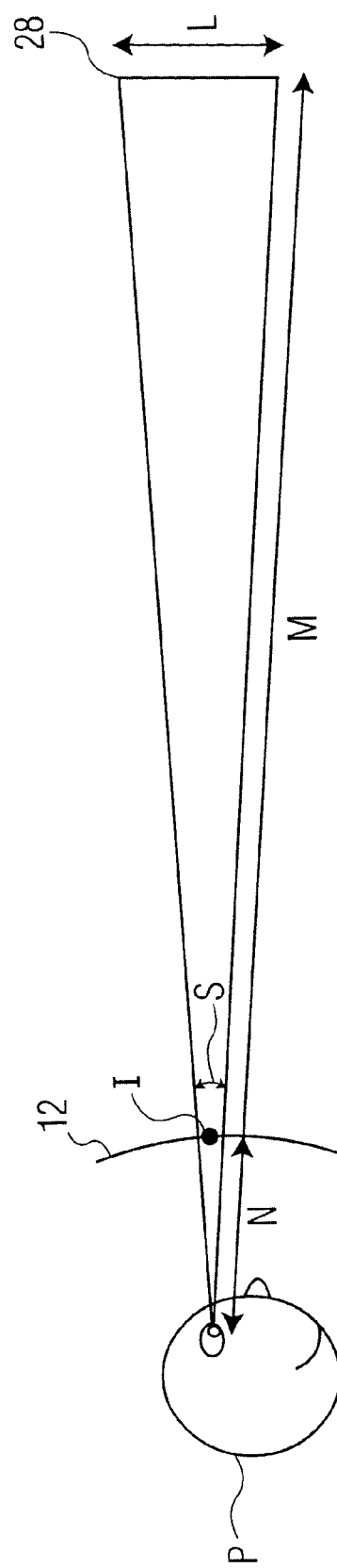
FIG. 6 is a representative drawing of geometrical relationships used to describe the embodiment of FIGS. 4–5b.

As noted, the size and perspective of the image of the stop sign 28 on the windshield is also scaled so that it corresponds to (overlays) the actual stop sign 28 as seen by the driver through the windshield. Control unit 20 may scale the image of the stop sign 28 projected by the HUD 24 based on the size of the template used in matching the image. Alternatively, the image may be scaled using the distance between the driver P and the stop sign 28, the distance between the point I on the windshield and the stop sign 28, and the size of the actual stop sign. (The two distances may be readily calculated by control unit 20 based on the known coordinates of the stop sign 28, driver P and point I in the reference coordinate system.) Referring to FIG. 6, a good first order approximation of the scaling of the image of the stop sign 28 about point I on the windshield 12 is given as:

$$S = L * N/M$$

where S is the scaling factor used to scale the frontal dimensions of the actual stop sign 28 for generating the image depicted on the windshield 12, N is the distance from the driver P to the point I, M is the distance from the driver P to the stop sign 28 and L is the nominal or average width of the face frontal of the stop sign 28. The scaling factor S is used to scale the various frontal dimensions of the stop sign 28 for the HUD projection of the image of the stop sign on the windshield 12 about the point I.

Alternatively, instead of determining only the position of the central point I on the windshield 12 of the image of the stop sign, the position on the windshield for a number of specific points on the border of the actual stop sign 28 may also be determined in the same manner as for point I. The control unit 20 creates an image of the stop sign on the windshield that incorporates the specific points in the pertinent location on the border of the image. Thus, an overlaying image of the stop sign is created having the correct scale and position on the windshield.

Although illustrative embodiments of the present invention have been described herein with reference to the accompanying drawings, it is to be understood that the invention is not limited to those precise embodiments, but rather it is intended that the scope of the invention is as defined by the scope of the appended claims.

The following documents are also hereby incorporated by reference herein:

1) U.S. patent application Ser. No. 09/953,642, entitled "Intelligent Quad Display Through Cooperative Distributed Vision", for Srinivas Gutta et al., filed Sep. 17, 2001.

2) U.S. patent application Ser. No. 09/794,443, entitled "Classification Of Objects Through Model Ensembles" for Srinivas Gutta and Vasanth Philomin, filed Feb. 27, 2001, 3) U.S. patent application Ser. No. 09/703,423, entitled "Person Tagging In An Image Processing System Utilizing A Statistical Model Based On Both Appearance And Geometric Features" for Antonio Colmenarez and Srinivas Gutta, filed Nov. 1, 2000.

4) Announcement document "Siemens VDO's Color Head-Up Display Nears First Application", Sep. 12, 2001, published at www.itsa.org/itsnews.nsf/$A11/2E4A7421A07B0D6085256AC50067468A?OpenDocum ent.

5) "Autonomous Driving Approaches Downtown" by U. Franke et al., IEEE Intelligent Systems, vol. 13, no. 6, 1998 (available at www.gavrila.net)

What is claimed is:

1. A system for alerting a driver of an automobile to a traffic condition, the system comprising:
   at least one camera having a field of view and facing in the forward direction of the automobile, said at least one camera capturing images of the field of view in front of the automobile;
   a control unit for receiving the images of the field of view captured by the at least one camera, said control unit identifying objects of at least one predetermined type in the captured images, and analyzing the identified objects to determine whether any of the identified objects present a condition requiring a response by the driver; and
   a display for receiving control signals from the control unit regarding one or more of said identified objects which have been determined to present a condition requiring a response by the driver, and for displaying an image of said one or more of said identified objects to the driver, said displayed image being positioned and scaled so that said displayed image overlays a corresponding actual object as seen by the driver, the displayed image of the object enhancing a feature of the corresponding actual object to alert the driver,
   wherein the control unit identifies features in the objects of at least one predetermined type, said features being borders of a roadway in the image, and the control unit determines whether a movement of the automobile is inconsistent with the borders of the roadway.

2. A system for alerting a driver of an automobile to a traffic condition, the system comprising:
   at least one camera having a field of view and facing in the forward direction of the automobile, said at least one camera capturing images of the field of view in front of the automobile;
   a control unit for receiving the images of the field of view captured by the at least one camera, said control unit identifying objects of at least one predetermined type in the captured images, and analyzing the identified objects to determine whether any of the identified objects present a condition requiring a response by the driver; and
   a display for receiving control signals from the control unit regarding one or more of said identified objects which have been determined to present a condition requiring a response by the driver, and for displaying an image of said one or more of said identified objects to the driver, said displayed image being positioned and scaled so that said displayed image overlays a corresponding actual object as seen by the driver, the displayed image of the object enhancing a feature of the corresponding actual object to alert the driver,
   wherein the control unit identifies objects of at least one predetermined type in the captured images are pedestrians in the image, and the control unit determines whether the pedestrian and the automobile are on a collision course.

3. A system for alerting a driver of an automobile to a traffic condition, the system comprising:
   at least one camera having a field of view and facing in the forward direction of the automobile, said at least one camera capturing images of the field of view in front of the automobile;
   a control unit for receiving the images of the field of view captured by the at least one camera, said control unit identifying objects of at least one predetermined type in the captured images, and analyzing the identified objects to determine whether any of the identified objects present a condition requiring a response by the driver; and
   a display for receiving control signals from the control unit regarding one or more of said identified objects which have been determined to present a condition requiring a response by the driver, and for displaying an image of said one or more of said identified objects to the driver, said displayed image being positioned and scaled so that said displayed image overlays a corresponding actual object as seen by the driver, the displayed image of the object enhancing a feature of the corresponding actual object to alert the driver,
   wherein the objects of at least one predetermined type in the captured images traffic signs in the image, and the control unit determines whether a movement of the automobile is inconsistent with the traffic signs.

4. A system for alerting a driver of an automobile to a traffic condition, the system comprising:
   at least one camera having a field of view and facing in the forward direction of the automobile, said at least one camera capturing images of the field of view in front of the automobile;
   a control unit for receiving the images of the field of view captured by the at least one camera, said control unit identifying objects of at least one predetermined type in the captured images, and analyzing the identified objects to determine whether any of the identified objects present a condition requiring a response by the driver; and a display for receiving control signals from the control unit regarding one or more of said identified objects which have been determined to present a condition requiring a response by the driver, and for displaying an image of said one or more of said identified objects to the driver, said displayed image being positioned and scaled so that said displayed image overlays a corresponding actual object as seen by the driver, the displayed image of the object enhancing a feature of the corresponding actual object to alert the driver, wherein the objects of at least one predetermined type in the captured images are traffic signals in the image, and the control unit determines whether a movement of the automobile is inconsistent with the traffic signals.

5. A system for alerting a driver of an automobile to a traffic condition, the system comprising:

at least one camera having a field of view and facing in the forward direction of the automobile, said at least one camera capturing images of the field of view in front of the automobile;

a control unit for receiving the images of the field of view captured by the at least one camera, said control unit identifying objects of at least one predetermined type in the captured images, and analyzing the identified objects to determine whether any of the identified objects present a condition requiring a response by the driver; and a display for receiving control signals from the control unit regarding one or more of said identified objects which have been determined to present a condition requiring a response by the driver, and for displaying an image of said one or more of said identified objects to the driver, said displayed image being positioned and scaled so that said displayed image overlays a corresponding actual object as seen by the driver, the displayed image of the object enhancing a feature of the corresponding actual object to alert the driver, wherein the system comprises two cameras each facing in the forward direction of the automobile from different positions and each having a different respective field of view, the two cameras each capturing images of their respective field of view in front of the automobile.

6. The system as claimed in claim 5, wherein the control unit receives the images of the field of views from the respective cameras, identifies objects of at least one predetermined type in the images from each of the respective cameras, and analyzes the objects in the images received from each of the respective cameras to determine whether one or more of the identified objects presents a condition that requires a response by the driver.

7. The system as claimed in claim 6, wherein, when the control unit determines that an identified object presents a condition that requires a response by the driver, corresponding images of the identified object in the images received from each of the respective cameras are used by the control unit to determine a distance between a point on the automobile and the identified object.

8. The system as claimed in claim 7, wherein the control unit determines the distance between a point on the automobile and the object using stereo techniques.

9. The system as claimed in claim 8, wherein the point on the automobile is located approximately at a position of the driver's head when driving the automobile.

10. The system as claimed in claim 9, wherein the control unit generates control signals for the display unit designating the position and scale of the image of the object using the distance between the driver's head and the object.

11. A method for alerting a driver of an automobile to a traffic condition, the method comprising the steps:

capturing images of a field of view in front of the automobile;

identifying objects in the images of at least one predetermined type, and analyzing the objects to determine whether one or more of the identified objects present a condition that requires a response of the driver; and displaying to the driver an image of at least one of the identified objects requiring the driver's response, the displayed image being positioned and scaled so that displayed image of the object overlays a corresponding actual object as seen by the driver, the displayed image of the object enhancing a feature of the corresponding actual object to alert the driver, wherein the step of identifying objects in the image of at least one predetermined type and analyzing the objects to determine whether one or more of the identified objects present a condition that requires the driver's response, includes identifying at least one of pedestrians and other automobiles in the image, and determining whether any identified pedestrians and other automobiles are on a collision course with the automobile.

12. A method for alerting a driver of an automobile to a traffic condition, the method comprising the steps:

capturing images of a field of view in front of the automobile;

identifying objects in the images of at least one predetermined type, and analyzing the objects to determine whether one or more of the identified objects present a condition that requires a response of the driver; and displaying to the driver an image of at least one of the identified objects requiring the driver's response, the displayed image being positioned and scaled so that displayed image of the object overlays a corresponding actual object as seen by the driver, the displayed image of the object enhancing a feature of the corresponding actual object to alert the driver, wherein the step of identifying objects in the image of at least one predetermined type and analyzing the objects to determine whether one or more of the identified objects present a condition that requires the driver's response, includes identifying at least one of traffic signs and traffic signals in the image, and determining whether the movement of the automobile is inconsistent with any identified traffic signs and traffic signals.

* * * * *